Dec. 31, 1935.  M. LARSSON  2,025,756
METHOD OF PRODUCING SODIUM SULPHATE AND THE LIKE
Filed June 7, 1933
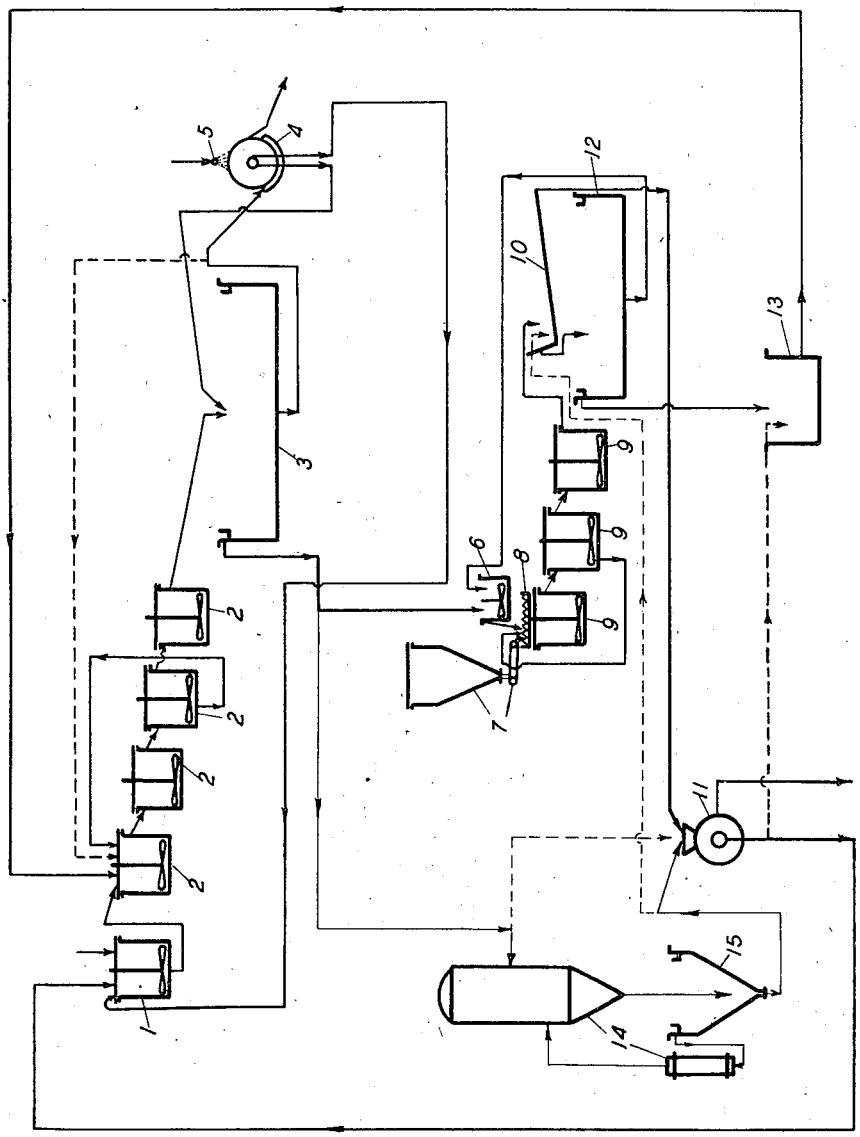
INVENTOR
MARKUS LARSSON
BY
ATTORNEY Patented Dec. 31, 1935

2,025,756

UNITED STATES PATENT OFFICE 2,025,756

METHOD OF PRODUCING SODIUM SULPHATE AND THE LIKE

Markus Larsson, Berlin, Germany

Application June 7, 1933, Serial No. 674,669

8 Claims. (Cl. 23—121)

This invention relates to the production of salts in solid state from solutions thereof produced by chemical reactions.

It is particularly applicable to a process for the production of solid sodium sulphate from calcium sulphate by reaction with sodium carbonate or bicarbonate in the presence of sodium sulphate.

Such a process is interesting in connection with methods for the manufacture of phosphates by reaction of sodium sulphate, nitric acid, and phosphate rock, wherein the solid sodium sulphate necessary for the reaction may be regenerated from the calcium sulphate formed as a waste product in the process.

The invention has for one purpose the production of a solid salt, such as in the cited example, sodium sulphate, at the same time eliminating to a large or substantially complete extent, the expensive step of evaporation.

Describing the invention with particular reference to the formation of sodium sulphate:—

If calcium sulphate is reacted with sodium carbonate or bicarbonate in the presence of sodium sulphate solution, under proper conditions, such as temperature and concentration, rapid and practically complete conversion of calcium sulphate to sodium sulphate takes place according to either of the following reactions without the formation of objectionable impurities:

I  $CaSO_4 + Na_2CO_3 = CaCO_3 + Na_2SO_4$

II  $CaSO_4 + 2NaHCO_3 = CaCO_3 + Na_2SO_4 + CO_2 + H_2O$

The calcium carbonate crystals formed are large and easily removable from the solution requiring relatively small amounts of wash water which would have to be evaporated later.

According to usual processes, the sodium sulphate or other salt would be obtained in solid form by separating the precipitated calcium carbonate in a thickener, filter, centrifuge, or other known separating device and the sodium sulphate liquor would then be evaporated to crystallize out sodium sulphate.

It is one object of this invention to omit all or practically all of the substantial expense of evaporation by a series of simple steps so coordinated as to form a complete and unified cycle of operation involving practically no waste of materials or labor.

The invention as applied to sodium sulphate, with many detail refinements may be seen from a study of the attached flowsheet in connection with the description. In its simplest form it may be considered to involve the reaction between $CaSO_4$ and $Na_2C_3$, the separation of the precipitated $CaCO_3$ from the $Na_2SO_4$, the "salting out" of solid sodium sulphate from its solution by adding to it the solid sodium carbonate needed in the initial reaction, separation of the sodium sulphate crystals and return of the mixed sodium sulphate—sodium carbonate solution to the initial reaction for conversion of fresh $CaSO_4$.

Describing that embodiment of the invention involving sodium sulphate in conection with the attached diagrammatic flowsheet:

Calcium sulphate is introduced into the repulper 1 where it is mixed with sodium sulphate mother liquor from the filter 11 and with wash filtrate from the filter 4. The resultant mix or slurry is passed into the first of a series of continuous reaction agitators 2, where it is reacted with sodium carbonate—sodium sulphate solution from the storage tank 13. At the same time a small amount of calcium carbonate slurry from one of the subsequent reaction agitators 2, and from the thickener 3 is returned to the first agitator.

In the thickener 3, the reaction mixture is separated, part of the sludge being returned to the reaction agitators to make it possible to increase and control the ratio between solids and solution in the reaction. The bulk of the calcium carbonate is filtered and washed on the filter 4, by means of spray 5. Part of the wash filtrate is returned to the thickener 3 and part to the repulper 1.

The main part of the sodium sulphate solution overflowing from the thickener 3 is passed to the agitator 6 where it is mixed with the thickened fine crystalline sodium sulphate slurry from the thickener 12 and the mixture is then added to the agitators 9.

Sodium carbonate from the bin and poidometer 7, in amounts necessary for the original reaction with the calcium sulphate, is introduced into the mixer 8 where it is stirred into a portion of recirculating sodium sulphate sludge from one of the agitators 9. In the series of agitators 9, the sodium carbonate passes into solution causing practically an equal amount by weight of sodium sulphate to crystallize or be "salted" out.

From the last of these agitators, the crystal slurry is continuously passed to a classifier 10 in which the larger sodium sulphate crystals are removed and on the salt filter 11 are freed from mother liquor and washed with part of the sodium sulphate solution from the thickener 3 and dried.

The overflow from the classifier 10, containing fine sodium sulphate crystals suspended therein, is allowed to settle in the thickener 12, the separated fine crystal slurry being carried back to the agitator 6.

The mother liquor from the thickener 12, consisting of a solution of sodium sulphate and sodium carbonate is retained in the storage tank 13, whence it is returned to the reaction in the agitators 2.

A smaller part of the overflow from the thickener 3 goes to the continuous evaporator 14, the crystals being settled in the cones 15 and is filtered directly on the salt filter 11 together with the large crystals from the classifier 10 or is first passed to the classifier 10.

A small portion of the overflow from the thickener 3 may be used as wash on the salt filter 11. Mother liquor from the salt filter is returned to the repulper 1 as previously mentioned or it may be passed to the storage tank 13.

The reaction between the calcium sulphate and sodium carbonate proceeds very rapidly at a temperature of 40–50° C., and the precipitated calcium carbonate is obtained in a form easy to separate from the solution when the reaction is carried out continuously with simultaneous addition of calcium sulphate and sodium carbonate solution.

That this reaction proceeds so well and rapidly can be explained by the fact that the solubility of gypsum in a 29–30% solution of sodium sulphate at the reaction temperature is about the same as in water at the same temperature, corresponding to a concentration of 0.08–0.09% CaO.

Theoretically a very small excess of sodium carbonate would be sufficient to convert the gypsum completely into calcium carbonate, but in order to obtain sufficiently high reaction velocity a certain excess of sodium carbonate must be maintained during the reaction. This is especially the case when a solution of 30% or more sodium sulphate is produced in the reaction. In that case a concentration of 2–3% sodium carbonate should be maintained during the reaction as otherwise a double salt of sodium-calcium sulphate may easily be precipitated as fine needles which are but slowly decomposed to sodium sulphate and calcium carbonate. When the concentration of sodium sulphate is lower than 30% the velocity of such double salt formation is very materially decreased.

It is especially advantageous to mix the sodium carbonate solution with finished sludge, consisting of already produced sodium sulphate solution and calcium carbonate as in this way the concentration of carbonate ions will be decreased and consequently a coarser precipitate will be obtained.

As the maximum solubility of sodium sulphate in water is 33.2% at a temperature of 32.4° C., and the solubility decreases with an increase in temperature, it is not practicable to produce a more concentrated solution than around 30% $Na_2SO_4$ and in order to obtain an anhydrous product more than 2 tons water per ton sodium sulphate would have to be evaporated.

When working according to the method of this invention the calcium carbonate is obtained in such a good shape that around 0.43 tons water per ton produced sodium sulphate is sufficient to wash the precipitate completely free from sodium sulphate and only 0.3 ton of this water enters the reaction as wash liquor, the rest being discharged with the cake. If the calcium sulphate is introduced for instance, as gypsum ($CaSO_4.2H_2O$), around 1.45 tons water must be added to the reaction with the only object of obtaining the sodium sulphate as a solution the water of which will later on have to be evaporated.

Following the reaction between calcium sulphate and sodium sulphate, the sodium sulphate containing some excess sodium carbonate is separated from the calcium carbonate precipitate and then mixed with solid sodium carbonate which dissolves at the same time precipitating sodium sulphate. This reaction is most advantageously carried out at a temperature of 60–70° C. in a continuously operating series of agitators, where solid sodium carbonate and sodium sulphate solution are added simultaneously.

Special precautions must be taken to secure a complete dissolution of the sodium carbonate which has a tendency to form lumps, when added directly to the agitator. Therefore the sodium carbonate is mixed with fairly large amounts of already produced sludge in a mixer or blunger, whereby the formation of lumps can be prevented, and consequently complete dissolution be obtained.

In practice it is not desirable to add more sodium carbonate than corresponding to around a 10% solution, as by higher concentrations some kind of double salt starts crystallizing together with the sodium sulphate.

At above mentioned reaction temperature the saturated mixed solution then contains 10% $Na_2CO_3$ and around 23% $Na_2SO_4$. In order to obtain good and uniform sodium sulphate crystals, the crystal slurry is passed through a classifier, where the larger crystals are separated from the solution and the smaller crystals. The solution is then separated from the smaller crystals in a thickener or filter and these crystals returned to the reaction. As these small crystals often contain undissolved sodium carbonate and a small amount of double salt, it is advisable to mix them with newly produced sodium sulphate solution, before adding them to the reaction in order to decompose double salt and dissolve the carbonate.

The solution of sodium sulphate and sodium carbonate is returned to the reaction with $CaSO_4$, whereby the sodium carbonate is converted into sodium sulphate. The increase in salt concentration by the reaction makes it necessary to add around 0.5 ton water per ton produced sodium sulphate which corresponds very closely to the amount of water introduced as water of crystallization with the gypsum and by the washing process of the calcium carbonate.

Only around ¾ of the produced sodium sulphate can be precipitated by the sodium carbonate, the remaining ¼ must be produced by evaporation of at least 0.5 ton water per ton totally produced sodium sulphate. As the water introduced by the washing process and as synthetic water in the gypsum is around 0.55 ton, it is obvious that in the above process it is unnecessary to add water which must be evaporated later on.

If it should be desirable to produce part of the sodium sulphate as $Na_2SO_4.10H_2O$ which can be made by cooling the saturated solution to temperatures below 30° C., a correspondingly smaller amount of water has to be evaporated. It is also possible to return part of the $Na_2SO_4.10H_2O$ so obtained to the precipitation reaction with $Na_2CO_3$ whereby it can be converted to the anhydrous form.

It is readily seen how the evaporation of the greater part of the water can be avoided by keeping it circulating in the system, simply by "salting out" the desired salt by means of another salt which has the effect of decreasing the solubility of the desired salt.

While it might be possible to introduce into the system an independent salt which would have such an effect, this might easily involve waste of chemicals if they could not be used in the process. By so selecting the "salting out" chemical, that it can be used earlier in the process, it is possible to carry out a cyclic process with the produced solutions all recirculated for use in earlier steps.

While this invention has been described as applied to the regeneration of sodium sulphate from calcium sulphate formed as a waste product in a phosphate plant, it is by no means limited thereto. It is capable of other uses on equivalently reacting substances without departing from the spirit and scope of the appended claims.

I claim:

1. The continuous method of producing sodium sulphate from calcium sulphate which comprises reacting calcium sulphate with a solution of sodium carbonate in the presence of sodium sulphate of substantially 30% concentration, in which an excess of 1 to 4% sodium carbonate is maintained during the reaction.

2. A cyclic process producing sodium sulphate from calcium sulphate which comprises reacting calcium sulphate with a solution of sodium carbonate containing sodium sulphate with the formation of precipitated calcium carbonate and a solution of sodium sulphate, separating the sodium sulphate solution, crystallizing therefrom solid sodium sulphate by the addition thereto of the sodium carbonate necessary for the initial reaction, and introducing the separated mother liquor into the initial reaction for conversion of further calcium sulphate.

3. The method according to claim 2 which comprises mixing finished sludge consisting chiefly of calicum carbonate and sodium sulphate solution with sodium carbonate and wash solution, and using the mixture for reaction with calcium sulphate.

4. The method according to claim 2 which comprises mixing reaction sludge consisting of sodium sulphate crystals in a mixed solution of sodium carbonate—sodium sulphate with the solid sodium carbonate before adding it to the sodium sulphate solution.

5. The method according to claim 2 which comprises separating the smaller sodium sulphate crystals from the larger crystals and from the solution, and mixing the thickened crystal slurry with the freshly formed sodium sulphate solution.

6. The method according to claim 2 which comprises using waste calcium sulphate obtained from a reaction between sodium acid sulphate, nitric acid, and phosphate rock in the reaction with sodium carbonate, and returning the produced solid sodium sulphate to prepare fresh solution to react with new quantities of phosphate rock.

7. The method according to claim 2 which comprises cooling the sodium sulphate solution to below 30° C. for crystallization of the sodium sulphate as $Na_2SO_4.10H_2O$.

8. A cyclic method for obtaining a desired salt in solid form from a solution thereof forming a reaction product of a continuous reaction between raw materials including two salts one of which will lower the solubility of the final desired salt, which comprises carrying out a continuous reaction between such two salts with the formation of an insoluble salt, separating the precipitated salt from the solution, continuously adding to said solution amounts of said solubility-lowering salt necessary to maintain the original reaction, for the purpose of crystallizing out therefrom said desired salt, separating the mother liquor from said crystallized salt, and returning said mother liquor to the original reaction to so provide one of the reacting salts.

MARKUS LARSSON.